H. HEMELRIGHT
HANDLES FOR POTS.
No. 185,322.   Patented Dec. 12, 1876.
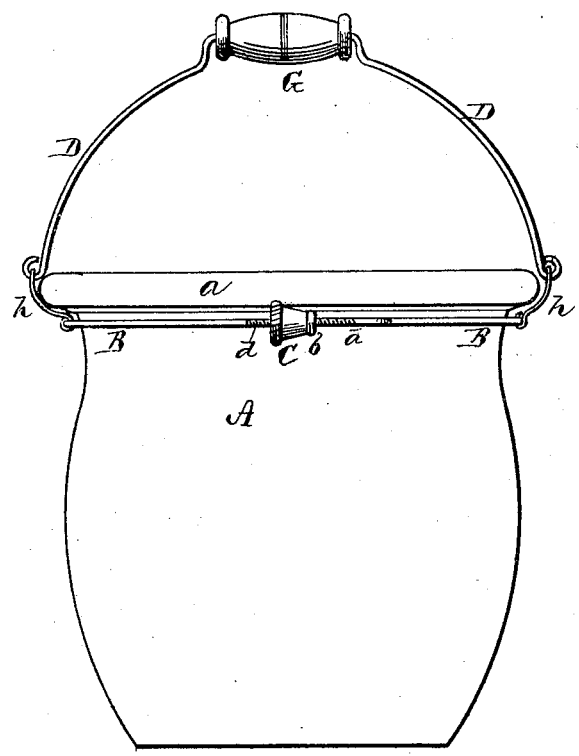
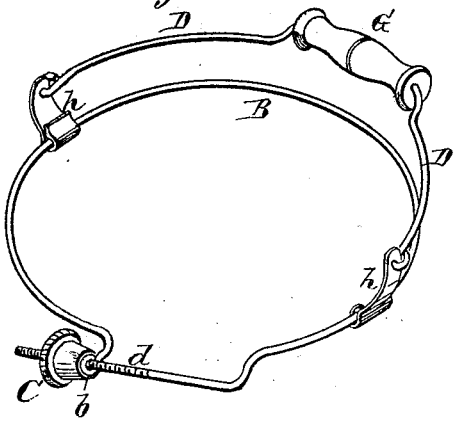

UNITED STATES PATENT OFFICE.

HENRY HEMELRIGHT, OF POTTSTOWN, PENNSYLVANIA.

IMPROVEMENT IN HANDLES FOR POTS.

Specification forming part of Letters Patent No. 185,322, dated December 12, 1876; application filed August 3, 1876.

*To all whom it may concern:*

Be it known that I, HENRY HEMELRIGHT, of Pottstown, in the county of Montgomery and State of Pennsylvania, have invented certain new and useful Improvements in Handles for Pots; and I do hereby declare that the following is a full, clear, and exact description thereof, reference being had to the accompanying drawings, and to the letters of reference marked thereon, which form a part of this specification.

The nature of my invention consists in the construction and arrangement of a handle for pots, as will be hereinafter more fully set forth.

In order to enable others skilled in the art to which my invention appertains to make and use the same, I will now proceed to describe its construction and operation, referring to the annexed drawing, in which—

Figure 1 is a side view of a pot with my handle attached thereto. Fig. 2 is a perspective view of the handle detached.

A represents an earthen or other pot, provided around its upper edge with an outwardly-projecting rim or flange, $a$, as shown. B represents a wire to go around the pot A, immediately below the rim $a$. One end of this wire is bent outward and forms an eye, $b$, while the other end, $d$, is bent first outward and then in the same direction as before, so that it will enter or pass through the eye $b$. The end $d$ of the wire is provided with exterior screw-threads, and a thumb-nut, C, is screwed thereon after it is passed through the eye $b$, so as to tighten the wire B around the pot. On the wire B are two movable ears, $h$ $h$, which are connected by a bail, D, said bail being provided with a wooden handle, G, as shown.

This device can be made to fit a pot whether small or large, and the ears $h$ $h$ can be moved backward or forward, so as to bring the bail always in the center.

Having thus fully described my invention, what I claim as new, and desire to secure by Letters Patent, is—

The combination of the wire B, provided at one end with the eye $b$, and the other end being bent and provided with exterior screw-threads, with the thumb-nut C, movable ears $h$ $h$, bail D, and handle G, all substantially as and for the purposes herein set forth.

In testimony that I claim the foregoing as my own I affix my signature in presence of two witnesses.

HENRY HEMELRIGHT.

Witnesses:
E. F. BERTOLET,
CHS. RUTTER.